United States Patent
Barua et al.

(10) Patent No.: US 11,221,610 B1
(45) Date of Patent: Jan. 11, 2022

(54) OPTIMIZED SUPPORT DESIGN FOR SINTERING PARTS WITH COMPLEX FEATURES

(71) Applicant: GENERAL ELECTRIC COMPANY, Schenectady, NY (US)

(72) Inventors: Ananda Barua, Schenectady, NY (US); Changjie Sun, Clifton Park, NY (US); Sathyanarayanan Raghavan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 16/587,991

(22) Filed: Sep. 30, 2019

(51) Int. Cl.
*G05B 19/4099* (2006.01)
*B33Y 50/02* (2015.01)
*B29C 64/393* (2017.01)

(52) U.S. Cl.
CPC ........ *G05B 19/4099* (2013.01); *B29C 64/393* (2017.08); *B33Y 50/02* (2014.12); *G05B 2219/35134* (2013.01); *G05B 2219/49007* (2013.01)

(58) Field of Classification Search
USPC .......................................................... 700/98
See application file for complete search history.

(56) References Cited

U.S. PATENT DOCUMENTS

| | | | |
|---|---|---|---|
| 6,399,010 B1 | 6/2002 | Guertin et al. | |
| 9,950,476 B2 | 4/2018 | Nguyen et al. | |
| 10,035,298 B2 | 7/2018 | Mark | |
| 10,166,316 B2 | 1/2019 | Landon et al. | |
| 2017/0312986 A1 | 11/2017 | Qian | |

(Continued)

FOREIGN PATENT DOCUMENTS

| | | |
|---|---|---|
| CN | 105506337 B | 4/2018 |
| CN | 108388762 A | 8/2018 |

(Continued)

OTHER PUBLICATIONS

Vanek, Clever Support: Efficient Support Structure Generation for Digital Fabrication; Eurographics Symposium on Geometry Processing, vol. 33 (2014), pp. 118-125. DOI: 10.1111/cgf.12437 (Year: 2014).*

(Continued)

*Primary Examiner* — Mohammad Ali
*Assistant Examiner* — Joshua T Sanders
(74) *Attorney, Agent, or Firm* — Dinsmore & Shohl LLP (57) ABSTRACT

A method and system to receive a specification defining a model of a part to be produced by an additive manufacturing (AM) process; define a design space to enclose the part and a support structure for the part, the support structure to support the part and printed with the part during the AM process; execute an iterative topology optimization(TO) based at least in part on the specification for the part and the defined design space, to generate a TO support structure that counteracts predicted gravity-based distortions during the AM process; save a record of the generated TO support structure; and transmit the record of the TO support structure to an AM controller, the AM controller to control an AM system to generate an instance of the part and the TO support structure based on the record.

15 Claims, 7 Drawing Sheets

(56) References Cited

U.S. PATENT DOCUMENTS

2018/0079149 A1* 3/2018 Suresh .................. B33Y 50/00
2018/0221950 A1* 8/2018 Mark .................... B33Y 10/00
2018/0330042 A1* 11/2018 Byers .................... G06F 30/17
2019/0079491 A1 3/2019 Barua et al.

FOREIGN PATENT DOCUMENTS

EP 3472569 A1 4/2019
WO 2017/216059 A1 12/2017

OTHER PUBLICATIONS

Mezzadri, Topology optimization of self-supporting support structures for additive manufacturing; Additive Manufacturing 21 (2018), pp. 666-682. DOI: 10.1016/j.addma.2018.04.016 (Year: 2018).*

Bornoff et al.: "An additive design heatsink geometry topology identification and optimisation algorithm", 2015 31st Thermal Measurement, Modelling & Management Symposium (SEMI-THERM), Mar. 15-19, 2015, pp. 303-308 Conference Location: CA.

Liu et al., "Current and Future Trends in Topology Optimization for Additive Manufacturing", Structural and Multidisciplinary Optimization, vol. 57, Issue: 6, pp. 2457-2483, Jun. 2018.

European Search Report dated Oct. 23, 2020 which was issued in a counter part application EP 20196495.4.

Grégoire Allaire: "Optimizing supports for additive manufacturing", Structural and Multidisciplinary Optimization, vol. 58, No. 6 Oct. 30, 2018, pp. 2493-2515.

* cited by examiner

FIG. 7

OPTIMIZED SUPPORT DESIGN FOR SINTERING PARTS WITH COMPLEX FEATURES

BACKGROUND

The field of the present disclosure generally relates to additive manufacturing, and more particularly, to an additive manufacturing tool to determine optimal support structures for sintering parts of an additive manufacturing process with complex features.

Parts generated using a binder jet modality of additive manufacturing (AM) processes oftentimes experience gravity-based deformations or distortions during a sintering phase of the AM fabrication process. The sintering of binder jet parts may involve high temperatures (e.g., about 1000 degrees C.), during which unsupported portions of the part be fabricated may experience warping and other distortions or deformations of the part, where the shape of the part deviates from the specified (i.e., nominal) shape of the part. Conventional methods to design supports for the part are primarily manual processes that rely heavily on the experience and/or knowledge of the support designer and/or trial and error. As such, manual processes are inefficient, time-consuming, and not repeatable. Moreover, only parts with simple geometries requiring simple or no support(s) during sintering are typically suitable for sintering.

Unfortunately, there is no existing methodology to design supports for parts having complex geometries that may be expected to have large distortions during sintering, while also accounting for the required dimensional design tolerances for the parts.

Accordingly, in some respects, a need exists for methods and systems that provide an efficient and automated mechanism for designing AM optimized support structures for a part during sintering that further achieves the required dimensional tolerances for the part.

BRIEF DESCRIPTION

According to some embodiments, a method includes receiving, by a processor, a specification defining a model of a part to be produced by an additive manufacturing (AM) process; defining, by the processor, a design space to enclose a support structure for the part, the support structure to support the part and be printed with the part during the AM process; executing, by the processor, an iterative topology optimization(TO) based at least in part on the specification for the part and the defined design space, to generate a TO support structure that counteracts predicted gravity-based distortions during the AM process; saving, by the processor, a record of the generated TO support structure; and transmitting, by the processor, the record of the TO support structure to an AM controller, the AM controller to control an AM system to generate an instance of the part and the TO support structure based on the record.

According to some embodiments, a system includes a memory storing processor-executable instructions; and one or more processors to execute the processor-executable instructions to receive a specification defining a model of a part to be produced by an additive manufacturing (AM) process; define a design space to enclose the part and a support structure for the part, the support structure to support the part and printed with the part during the AM process; execute an iterative topology optimization(TO) based at least in part on the specification for the part and the defined design space, to generate a TO support structure that counteracts predicted gravity-based distortions during the AM process; save a record of the generated TO support structure; and transmit the record of the TO support structure to an AM controller, the AM controller to control an AM system to generate an instance of the part and the TO support structure based on the record.

According to some embodiments, a non-transitory computer readable medium includes receiving a specification defining a model of a part to be produced by an additive manufacturing (AM) process; defining a design space to enclose a support structure for the part, the support structure to support the part and be printed with the part during the AM process; executing an iterative topology optimization (TO) based at least in part on the specification for the part and the defined design space, to generate a TO support structure that counteracts predicted gravity-based distortions during the AM process; saving a record of the generated TO support structure; and transmitting the record of the TO support structure to an AM controller, the AM controller to control an AM system to generate an instance of the part and the TO support structure based on the record.

Other embodiments are associated with systems and/or computer-readable medium storing instructions to perform any of the methods described herein.

DETAILED DESCRIPTION

Embodying systems and methods herein relate to Additive Manufacturing (AM) systems that, in general, produce a three-dimensional (3D) object or assembly by printing materials under computer control. AM may successively add materials, for example in layers, to create the three-dimensional assembly or object based on 3D model data (i.e., a specification). In some aspects, the present disclosure relates to metal binder jet printing or binder jetting modality of AM. In general, a binder jet process includes, for each layer of a part being fabricated, spreading a thin layer of metal powder over a build platform and selectively inkjetting a liquid binder agent (i.e., glue) onto the powder bed. This process repeats until the entire part is complete. After printing, the part is covered in the powder, allowed to cure to solidify the binder from a liquid to a solid in the powder bed, and de-powdered. At this stage, the "green" part is composed of metal powder particles held together with solid 'cured' binder. The 'green part has a relatively low solid density (about 50-60%) and is sintered (i.e., heat treated at high temperatures) to densify the part (about 90-99% density) so that it has strong mechanical properties.

Figure 1:
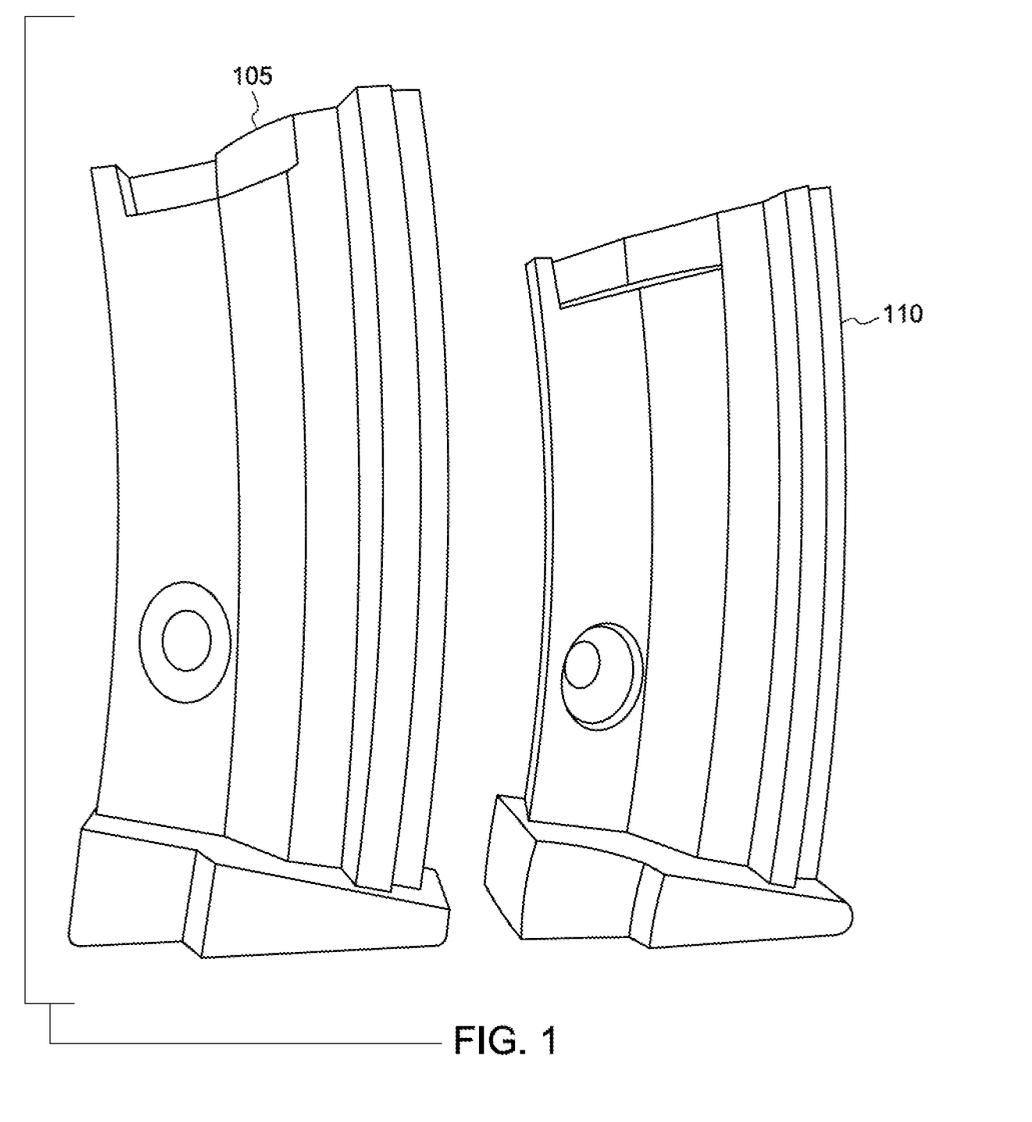
FIG. 1 is an illustrative depiction of shrinkage due to sintering in an AM process.

The part may be subjected to other post-processing steps, but the present disclosure may relate to distortions and deformations that might occur in the part during sintering. During sintering, the part is heated to burn out or decompose the binder and further heated to sinter the individual solid particles together to achieve the desired density. However, during sintering the part will generally experience shrinkage (e.g., about 30% to about 35%) as the part densifies. FIG. 1 is an illustrative example of shrinkage caused by sintering a part. FIG. 1 shows a "green" part 105 having a high porosity produced by metal binder jet printing. During sintering the part is densified and shrinks, as illustrated by part 110. As used herein, shrinkage refers to the volumetric change caused by densification during sintering. In some aspects, shrinkage may be corrected by scaling the nominal design (i.e., CAD design specification) of the part.

Figure 2:
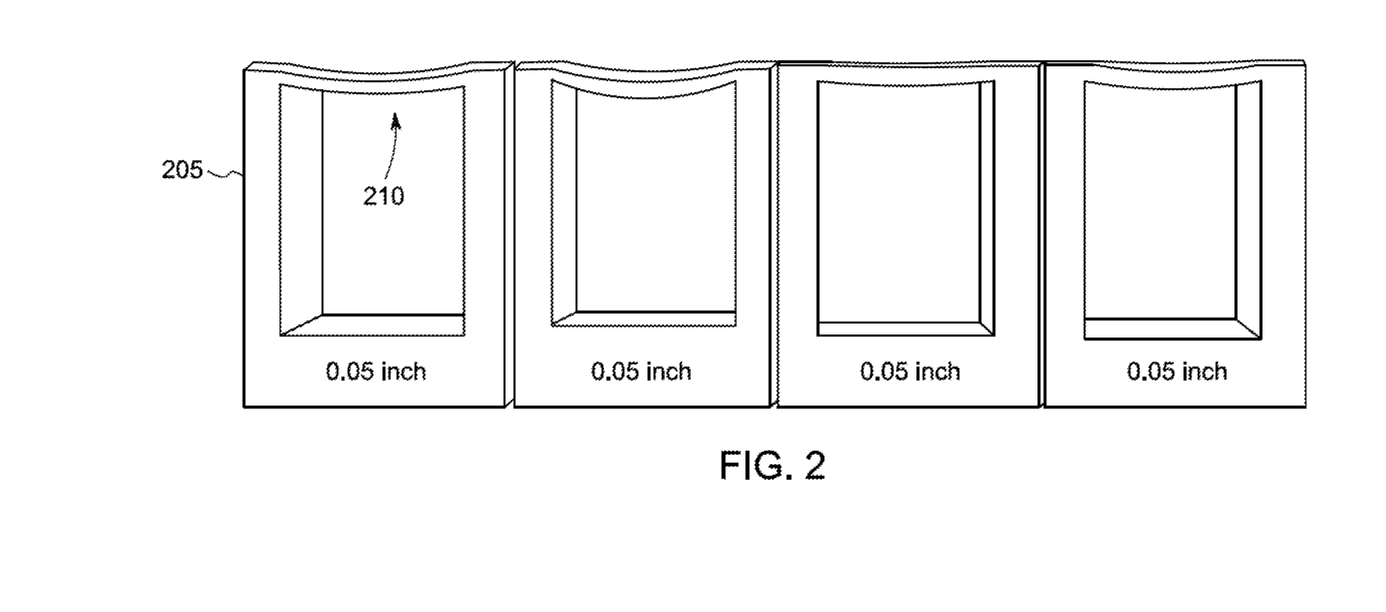
FIG. 2 is an illustrative depiction of gravity-based distortions that might be experienced during sintering in an AM process.

FIG. 2 includes an illustrative example of gravity induced or gravity-based warpage of a part. During sintering, any unsupported portion of a part (e.g., a bridge, overhang, etc.) may sag or warp due to gravitational forces acting on the unsupported portion of the part as the part is heated (e.g., about 1000 C). The resulting distortions or deformations caused by external forces (chiefly, gravity, but may also include friction, thermal gradient, etc.) are referred to herein as warpage and are a primary focus of the present disclosure.

In some aspects, the present disclosure includes a methodology to design optimized supports or support structures to minimize distortions, primarily warpage, during sintering of the part in a binder jet AM process, wherein the sintered part also achieves its required dimensions. The supports or support structures (used interchangeably herein) may be used to support a given part in a binder jet fabrication process to counteract distortions caused by external forces (e.g., gravity, etc.) during sintering. In some aspects, the support structures herein are intelligently designed so that the part will be sufficiently supported with a minimum amount of support material during sintering to minimize distortions and also result in a part that is within design tolerances.

Figure 3:
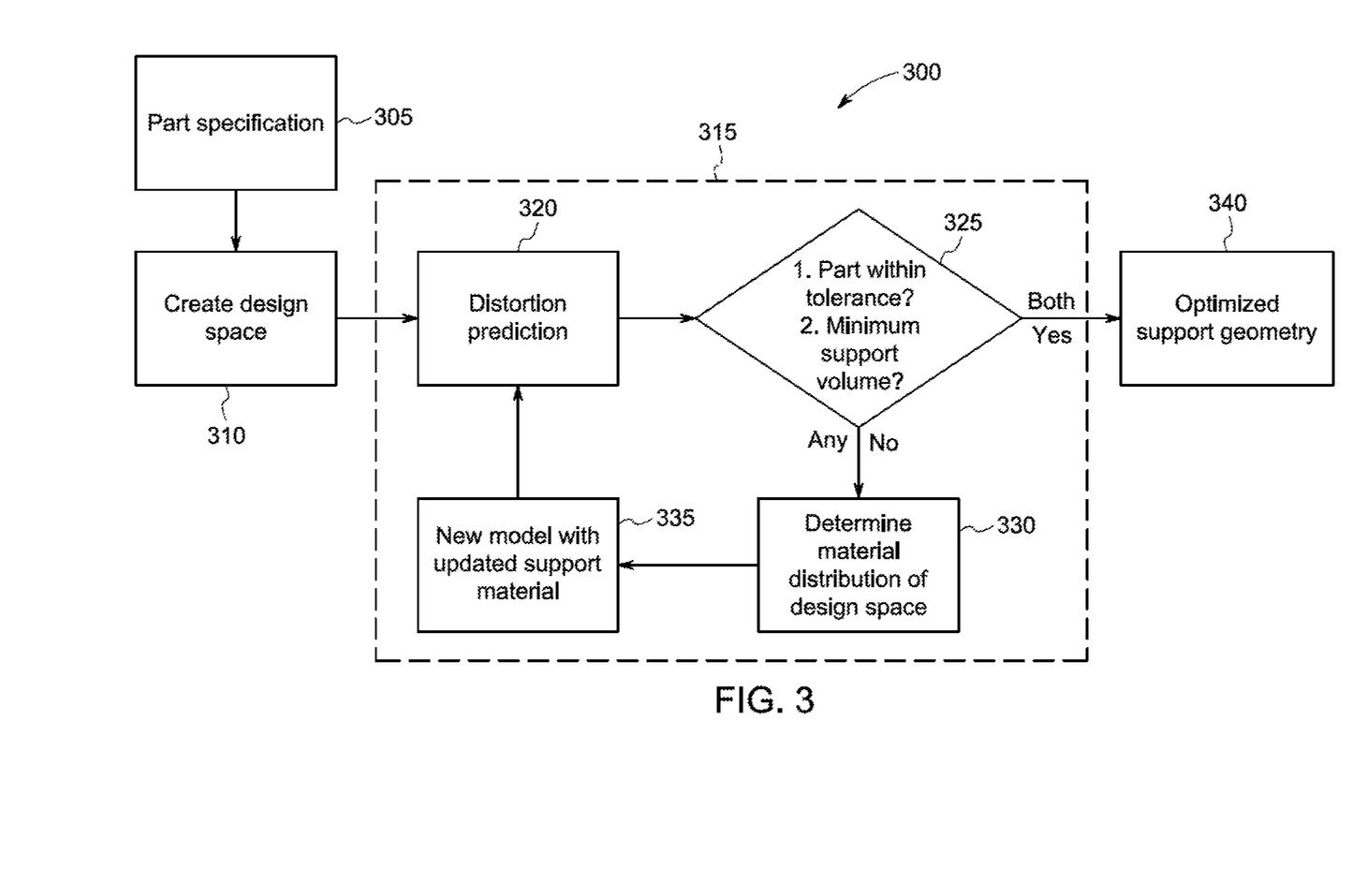
FIG. 3 is an illustrative example of a flow diagram of a process, in accordance with some embodiments.

FIG. 3 is an example flow diagram of a process 300 to predict an optimum support structure geometry of a binder jet fabricated or printed part undergoing a sintering process, in some example embodiments herein. In some aspects, process 300 includes an analysis framework to predict distortions to the part and an optimization routine to predict the material distribution in a given design space for the part.

Figure 4:
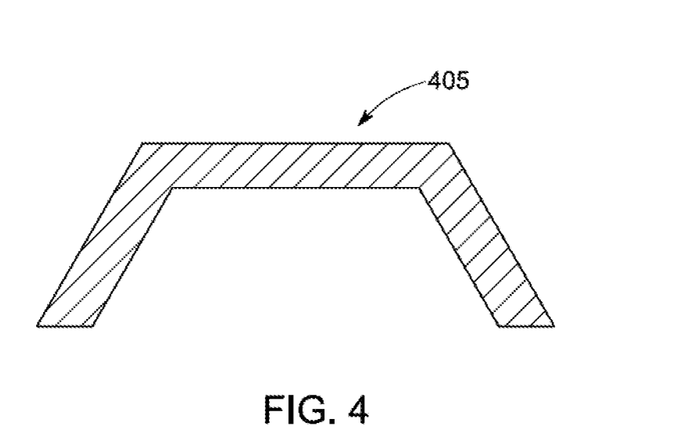
FIG. 4 is an illustrative example of a part, in accordance with some embodiments.

Part specification 305 includes inputs to process 300 and may be received from an engineer, designer, or other entity, system, process, or service. The inputs may include a specification (e.g., a computer-aided design (CAD) model representation of a part) including one or more of a model part's geometry, an orientation of the part, a material composition for the part, and the required dimensional tolerances for the part. FIG. 4 is an illustrative example depiction of a part 405 that might be defined by part specification 305.

Inputs 305 may be used to generate a design space for a support structure for the part at operation 310. The design space may be generated to encompass a support structure that can support the part during sintering of a binder jetting AM process. As used herein, the design space refers to a volume where support material of a support structure will be generated. Operation 310 may include creating the design space around the part geometry, wherein the part's geometry is included in part specification 305.

In some aspects, the design space may be created by a number of different techniques, including manual processes, automated (e.g., computer-aided) processes, and combinations thereof. For example, a manual creation of the design space may include creating a volume that is attached to or interfaces with the model part at one or more regions of the part and encloses a volume outside of the part. An example automated process to create the design space for the support structure might include a convex hull approach wherein the volume of a part is discretized into a set of points, X; a convex hull of a set of X points in a Euclidean space is the smallest set that contains X; and converting the convex hull into a volume that serves as the design space for the support structure. It is noted however that other techniques, processes, and methods of creating a design space for a support structure herein may be used and are not limited by the specific examples above. Moreover, the outer bounding box for the design space may be constrained based on an AM printer job box and/or other system and design requirements.

Figure 5:
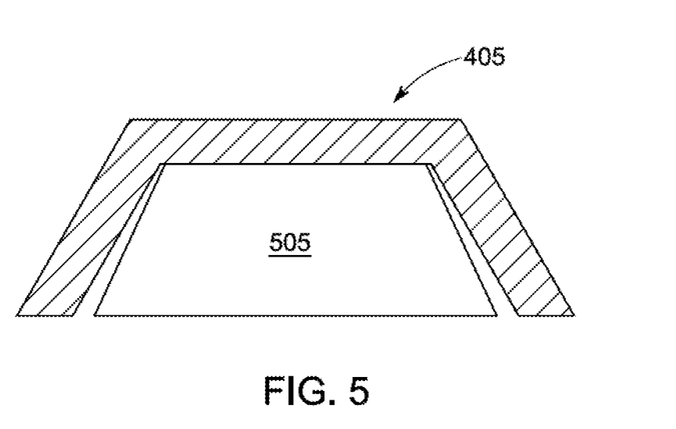
FIG. 5 is an illustrative depiction of the example part of FIG. 4 and a design space for a support structure for the part, in accordance with some embodiments.

The design space generated at operation 310 may be provided, transmitted, or otherwise provided to iterative process 315. Iterative process 315 may include a number of different aspects, including a distortion prediction 320, a topology optimization (TO) 330 and 335, and a compliance checking of the part tolerance(s) and part distortions 325. At operation 320, a finite element (FE) simulation representing the complex geometries of the given part (as specified in the part specification 305) and the design space (as defined at operation 310) is executed with gravity load and boundary constraints applied to the part and the design space. In some instances, the gravity load may be 1G, but may be set at a value to reflect an actual AM process application. FIG. 5 includes an illustrative example depiction of a part 405 (as introduced in FIG. 4) and a design space 505 for the particular part.

An output of operation 320 is provided to operation 325 to determine whether the predicted distortions are within the tolerances for the part (as specified in the part specification 305). Additionally, the support material distribution is examined to determine whether it is a minimum volume. In the event one or both of the part is not in tolerance(s) and the support material distribution is not minimized, then process 300 proceeds to operation 330. In the event both the part is identified as being within its design-specified dimensional tolerance(s) and the support material distribution is minimized (i.e., these two objective criteria converge), then process 300 proceeds to operation 340 and the support structure is saved as an optimized support structure for the part.

In some embodiments, iterative process 315 is responsible with optimizing the support material distribution of the support structure in the design space until both a minimum support volume and part tolerance(s) are achieved, as determined at operation 325. Iterative process 315 may be repeated until the part is sufficiently supported during sintering by a minimum volume of support material such that gravity-based distortions do not exceed the specified tolerance(s) for the part. Process 315 may be repeatedly iterated until both objectives of minimum support volume and part tolerance(s) are achieved.

At operation 330, the support material's volume is recalculated by a topology optimization process to produce a new model with updated support material 335. The distortion prediction of operation 320 is executed using the new model with updated support material 335 to calculate a new prediction distortion, which is checked for part tolerance compliance and minimum support volume at operation 325.

Upon convergence of the part tolerance compliance and minimum support volume, process 300 may terminate at 340. Otherwise, process 300 iterates until the objectives converge (or a maximum number of iterations are performed).

In some aspects, an optimized support structure geometry 340 determined by process 300 may be saved in a record, file, or other data structure, the configuration of which may conform to a now known data structure and/or file format or one that becomes known in the future. In some aspects, the optimized support structure may be submitted to a controller of an AM system or device (e.g., a binder jet system) that may use the record including the optimized support structure geometry provided to the AM system to fabricate an instance of the part and the optimized support structure, wherein the optimized support structure supports the part during a sintering phase of the AM process.

In some aspects, process 300, at least in part, provides a mechanism that, technically, enables the manufacture of parts with complex features using binder jetting processes, including powder metallurgy. In some embodiments, parts fabricated by an AM process including the optimized support structure supports disclosed herein may exceed the complexity and/or size of conventional AM processes (i.e., Direct Material Laser Melting, DMLM). In some aspects, the efficient processes disclosed herein may be leveraged to reduce manufacturing costs and/or manufacturing time for additive printing of large and complex parts.

Figure 6A:
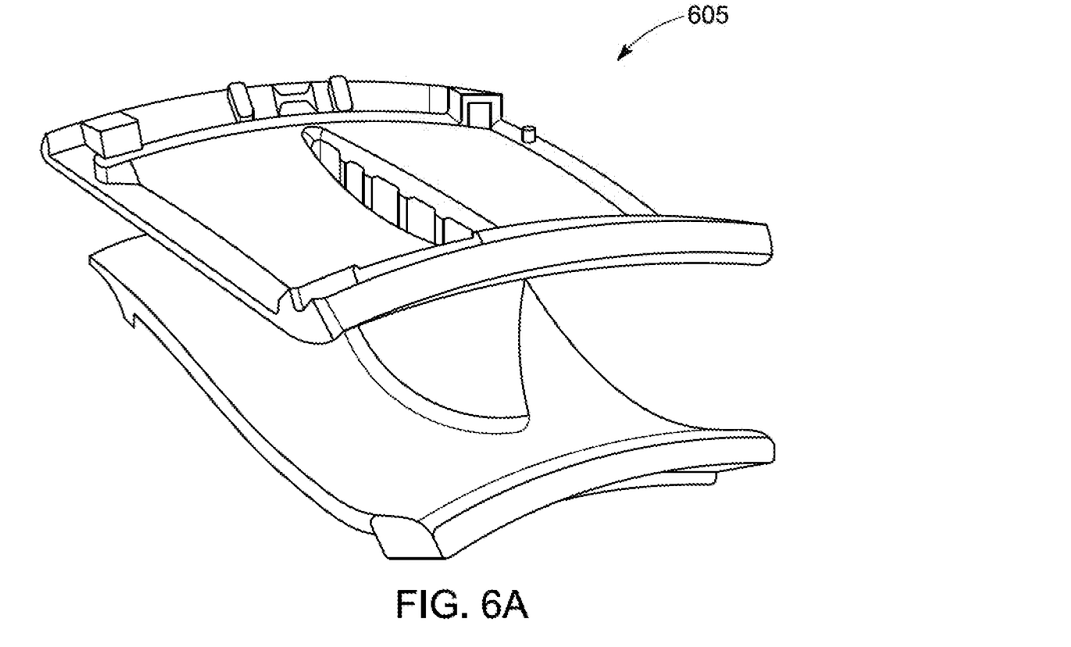
FIGS. 6A-6D are illustrative depictions of a part and a TO support structure generated for the part, in accordance with some embodiments.

FIGS. 6A-6D are illustrative depictions of a part and a TO support structure generated for the part, in accordance with some embodiments and aspects of the present disclosure. FIG. 6A is a illustrative depiction of a part that might be represented in a data model part specification (e.g., a CAD file) defining the part, wherein the part specification includes information defining the geometry of the part, its orientation, its dimensional tolerances, and its composition material.

Figure 6B:
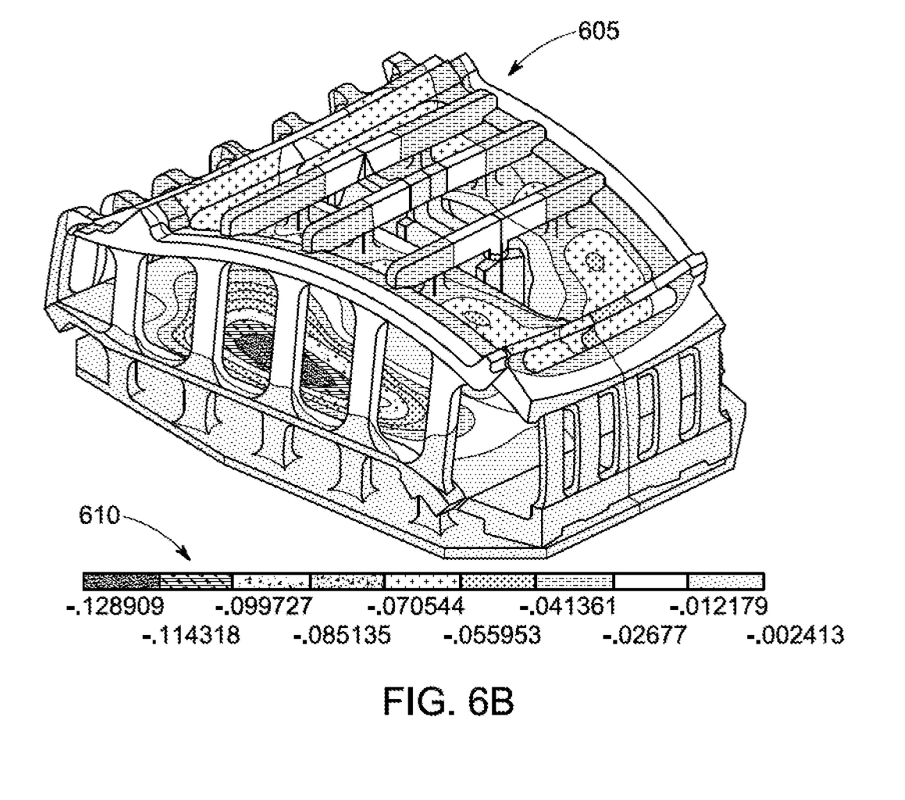

FIG. 6B is an illustrative depiction of a distortion prediction for part 605 produced by a simulated distortion prediction process (e.g., FIG. 3, 320), where the color (i.e., shading) of the part at any region thereof corresponds to the color-coded distortion key 610. Each color on the color-coded distortion key corresponds to a different range of distortion of the part resulting from an application of gravity and the boundary conditions for the support structure for the part.

Figure 6C:
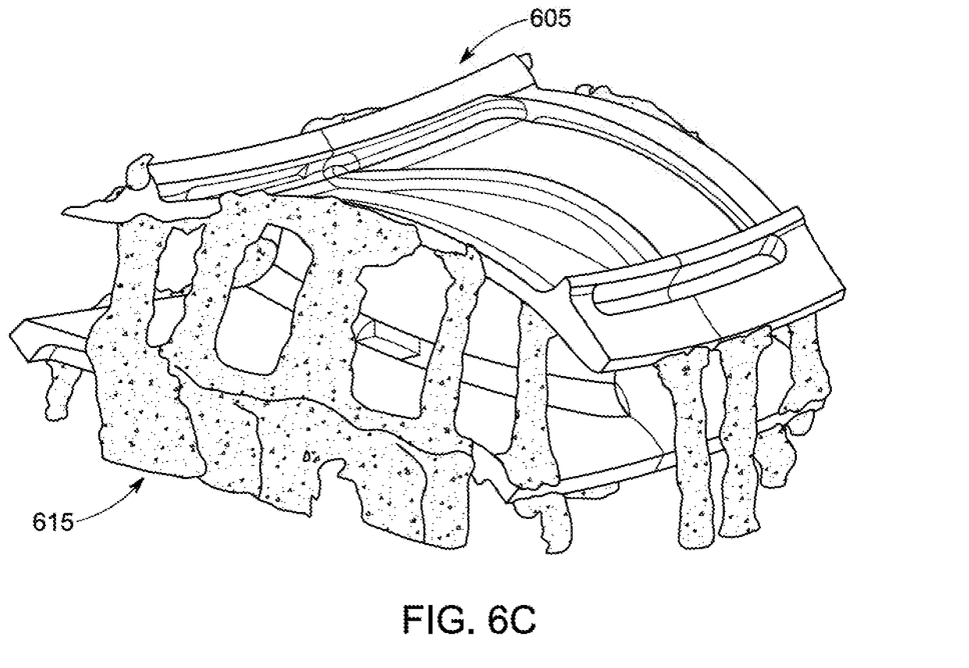

FIG. 6C is an illustrative depiction of a generated support structure 615 interfaced with a part 605, in accordance with other aspects of the present disclosure. In some aspects, support structure 615 may be a first or intermediate support structure generated in the process of determining an optimized support structure for the part.

Figure 6D:
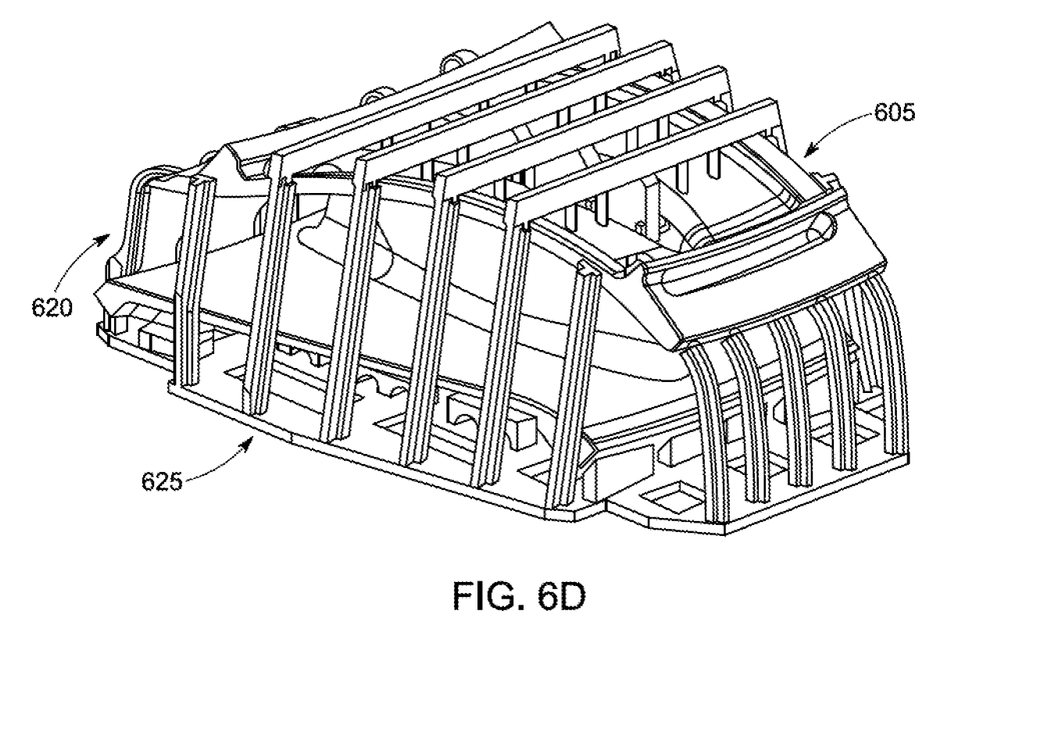

FIG. 6D is an illustrative depiction of an optimized support structure 620 interfaced with a part 605, in accordance with other aspects of the present disclosure. In some aspects, support structure 620 may be a final support structure generated in the process of determining an optimized support structure. In the example of FIG. 6D, a bottom skid-plate 625 is shown added to the optimized support structure 620, wherein skid-plate 625 may be added as practical matter to facilitate the fabrication of the optimized support structure.

In some embodiments, a support structure herein might be generated to form an integral portion of the part being fabricated. In some embodiments, a support structure herein might connect or interface with a part at, for example, machinable regions and the support structure may be readily be removed from the part after a sintering process. In some other embodiments, a support structure may interface with the part at regions or locations other than the machinable surfaces of the part that also need supporting. The manner of interfacing a support structure herein with a part is not limited to any one method or technique, whether by direct connection or an indirect connection with the part.

In some embodiments, an analysis of a process to produce an optimized support structure for a part may primarily focus on gravity-based distortions. In some embodiments, a process to produce an optimized support structure for a part may focus on gravity-based distortions and, additionally, distortions caused by shrinkage during a sintering process.

Figure 7:
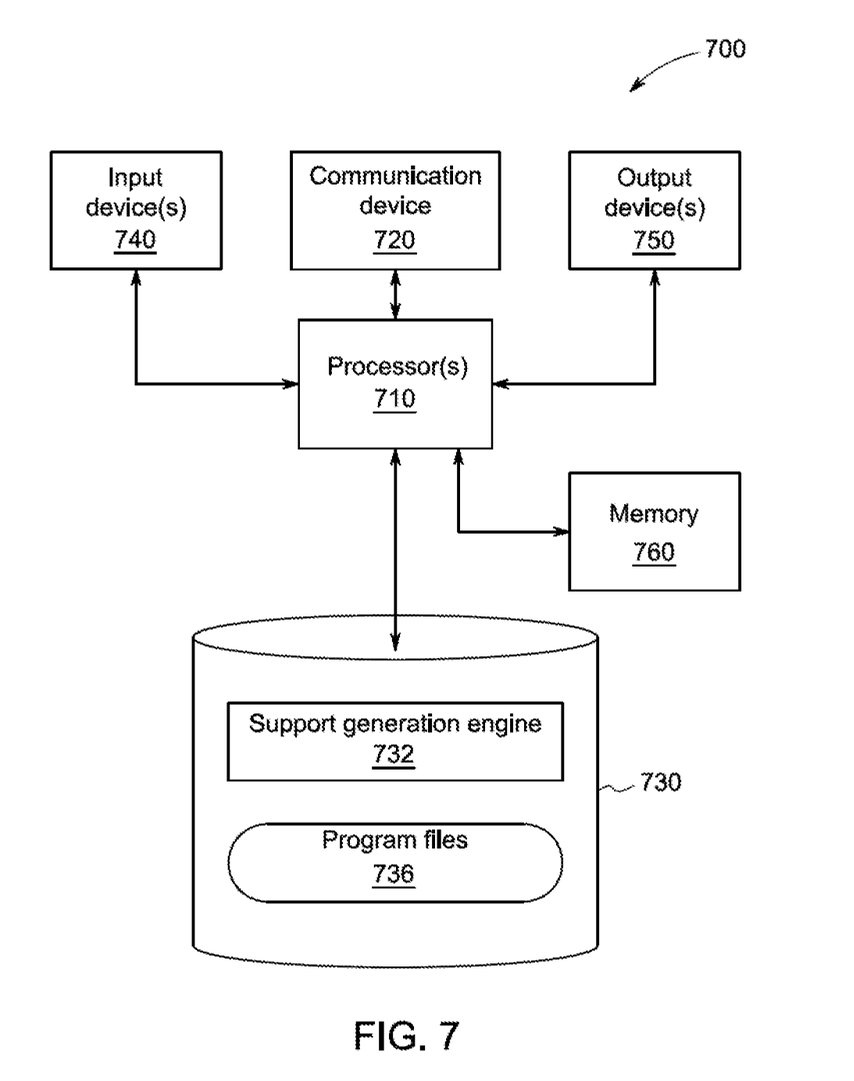
FIG. 7 illustrates a schematic diagram of a system, in accordance with some embodiments.

FIG. 7 is a block diagram of computing system 700 according to some embodiments. System 700 may comprise a general-purpose or special-purpose computing apparatus and may execute program code to perform any of the methods, operations, and functions described herein. System 700 may comprise an implementation of one or more systems (e.g., a support design tool, an AM system or parts thereof, etc.) and processes (e.g., 300). System 700 may include other elements that are not shown, according to some embodiments.

System 700 includes processor(s) 710 operatively coupled to communication device 720, data storage device 730, one or more input devices 740, one or more output devices 750, and memory 760. Communication device 720 may facilitate communication with external devices, such as a data server and other data sources. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into system 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM), Storage Class Memory (SCM) or any other fast-access memory.

Support generation engine 732 may comprise program code executed by processor(s) 710 (and within the execution engine) to cause system 700 to perform any one or more of the processes described herein. Embodiments are not limited to execution by a single apparatus. Data storage device 730 may also store data and other program code 736 for providing additional functionality and/or which are necessary for operation of system 700, such as device drivers, operating system files, etc.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of determining a selection of an optimal part consolidation using a greedy search process (i.e., process 600, FIG. 6).

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method comprising:
receiving, by a processor, a specification defining a model of a part to be produced by an additive manufacturing (AM) process;
defining, by the processor, a design space to enclose a support structure for the part, the support structure to support the part and be printed with the part during the AM process;
executing, by the processor, an iterative topology optimization(TO) based at least in part on the specification for the part and the defined design space, to generate a TO support structure that counteracts predicted gravity-based distortions during the AM process;
saving, by the processor, a record of the generated TO support structure;
transmitting, by the processor, the record of the TO support structure to an AM controller, the AM controller to control an AM system to generate an instance of the part and the TO support structure based on the record; and
determining, by the processor, whether the predicted gravity-based distortions are within a tolerance specified by the specification of the part and whether a volume of support material for the TO support structure is minimized,
wherein the iterative topology optimization further comprises:
in an instance in which either the predicted gravity-based distortions are not within the tolerance specified for the part or the volume of support material for the TO support structure is not minimized:
determining, by the processor, a new material distribution for the TO support structure in the defined design space; and
executing, by the processor, an AM simulation of the part based on the specification of the part and the new material distribution for the TO support structure in the defined design space to determine an updated prediction of gravity-based distortions to the part during the AM process.

2. The method of claim 1, wherein the specification defining the model of the part specifies at least a geometry of the part, an orientation of the part, a material composition of the part, and the tolerance for producing the part by the AM process.

3. The method of claim 1, wherein the TO support structure is created using a minimum of support material and wherein the part is within the tolerance as specified by the specification defining the model of the part.

4. The method of claim 1, wherein the TO support structure interfaces with the part at one or more regions of the part.

5. The method of claim 1, wherein the iterative topology optimization comprises:
applying, by the processor, gravity load and boundary constraints to the model of the part and the defined design space to determine the prediction of the predicted gravity-based distortions to the part during the AM process; and
terminating, by the processor, the iterative topology optimization in an instance the predicted distortions are within the tolerance specified for the part and the volume of support material for the TO support structure is minimized.

6. The method of claim 1, wherein the AM process is a binder jet metal additive manufacturing process.

7. The method of claim 1, wherein the support structure is integral to the part or removably connected to the part, or the support structure comprises a plurality of pieces that are individually either integral to the part or removably connected to the part.

8. The method of claim 1, wherein the TO support structure is optimized to further counteract a predicted shrinkage of the part during the AM process.

9. A system comprising
a memory storing processor-executable instructions; and
one or more processors to execute the processor-executable instructions to:
receive a specification defining a model of a part to be produced by an additive manufacturing (AM) process;
define a design space to enclose a support structure for the part, the support structure to support the part and be printed with the part during the AM process;
execute an iterative topology optimization(TO) based at least in part on the specification for the part and the defined design space, to generate a TO support structure that counteracts predicted gravity-based distortions during the AM process;
save a record of the generated TO support structure;
transmit the record of the TO support structure to an AM controller, the AM controller to control an AM system to generate an instance of the part and the TO support structure based on the record; and
determine, by the processor, whether the predicted gravity-based distortions are within a tolerance specified by the specification of the part and whether a volume of support material for the TO support structure is minimized,
wherein the iterative topology optimization further comprises:
in an instance in which either the predicted gravity-based distortions are not within the tolerance specified for the part or the volume of support material for the TO support structure is not minimized:
determining, by the processor, a new material distribution for the TO support structure in the defined design space; and
executing, by the processor, an AM simulation of the part based on the specification of the part and the new material distribution for the TO support structure in the defined design space to determine an updated prediction of gravity-based distortions to the part during the AM process.

10. The system of claim 9, wherein the specification defining the model of the part specifies at least a geometry of the part, an orientation of the part, a material composition of the part, and the tolerance for producing the part by the AM process.

11. The system of claim 9, wherein the TO support structure is created using a minimum of support material and wherein the part is within the tolerance as specified by the specification defining the model of the part.

12. The system of claim 9, wherein the TO support structure interfaces with the part at one or more regions of the part.

13. The system of claim 9, wherein the iterative topology optimization comprises:
   applying, by the processor, gravity load and boundary constraints to the model of the part and the defined design space to determine the prediction of the predicted gravity-based distortions to the part during the AM process; and
   terminating, by the processor, the iterative topology optimization in an instance the predicted distortions are within the tolerance specified for the part and the volume of support material for the TO support structure is minimized.

14. The system of claim 9, wherein the AM process is a binder jet metal additive manufacturing process.

15. The system of claim 9, wherein the support structure is integral to the part or removably connected to the part, or the support structure comprises a plurality of pieces that are individually either integral to the part or removably connected to the part.

* * * * *